US007775566B2

(12) United States Patent
Hanjono et al.

(10) Patent No.: US 7,775,566 B2
(45) Date of Patent: Aug. 17, 2010

(54) PUSH-BUTTON BOX-OPENING STRUCTURE

(75) Inventors: Hiroshi Hanjono, Wako (JP); Yasuhiro Suzuki, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 637 days.

(21) Appl. No.: 11/167,824

(22) Filed: Jun. 27, 2005

(65) Prior Publication Data

US 2006/0005589 A1    Jan. 12, 2006

(30) Foreign Application Priority Data

Jul. 6, 2004    (JP)    ............... 2004-199010

(51) Int. Cl.
  *E05C 3/06*    (2006.01)
  *E05C 3/16*    (2006.01)
(52) U.S. Cl. .............. 292/216; 292/24; 292/202; 292/304; 292/DIG. 31; 292/DIG. 37; 70/208; 296/37.8
(58) Field of Classification Search ............... 292/24, 292/25, 28, 31, 44, 45, 50, 54, 95, 96, 129, 292/195, 202, 216, 225, 300, 304, 336.5, 292/DIG. 31, DIG. 37, DIG. 62; 70/208, 70/DIG. 20; 296/37.8
See application file for complete search history.

(56) References Cited

U.S. PATENT DOCUMENTS

| 2,759,351 | A | * | 8/1956 | Allen | .................. 70/141 |
| 4,073,170 | A | * | 2/1978 | Miyabayashi et al. | ......... 70/256 |
| 5,308,126 | A | * | 5/1994 | Weger et al. | .................. 292/53 |
| 5,356,186 | A | * | 10/1994 | Favaro | .................. 292/216 |
| 5,857,720 | A | * | 1/1999 | Kim | .................. 292/98 |
| 6,048,001 | A | * | 4/2000 | Miller et al. | ................. 292/198 |
| 6,669,047 | B2 | * | 12/2003 | Wooderson et al. | .......... 220/316 |

FOREIGN PATENT DOCUMENTS

JP    2002-331876    11/2002

* cited by examiner

*Primary Examiner*—Carlos Lugo
(74) *Attorney, Agent, or Firm*—Rankin, Hill & Clark LLP

(57) ABSTRACT

A push-button box-opening structure is provided in which a push button is pushed in from an unlocking starting position to an unlocking position to open a storage box. The unlocking starting position is set at a position where the push button is pushed in a given depth from a pushing-in starting position so as to prevent inadvertent opening of the storage box. The storage box does not open when the button is inadvertently pushed in up to the given depth.

4 Claims, 11 Drawing Sheets

PUSH-BUTTON BOX-OPENING STRUCTURE

FIELD OF THE INVENTION

The present invention relates to push-button box-opening structures, and more particularly, to a push-button box-opening structure in which a push button is pushed in to open a box in a closed position.

BACKGROUND OF THE INVENTION

A storage box for holding small things is provided in the interior of an automobile. Some storage boxes are so constructed that a lid of a storage box is opened by depressing a depressed portion (hereinafter referred to as a "push button") (e.g., Japanese Patent Laid-Open Publication No. 2002-331876).

A storage box disclosed in 2002-331876 includes a storage pocket for holding small things and a lid for opening and closing an opening of the storage pocket. The lid is provided with a locking hook and an unlocking push button.

To open the lid from a closed position, the push button is depressed to release engagement between the hook and a striker. Thus, since only depressing the push button permits the lid to open, a passenger can easily open the lid.

However, since the above storage box has the lid opened only by depressing the push button, when an object in the vehicle interior (hereinafter referred to as an impacting object) strikes the push button, the push button can be depressed by the impacting object. If the push button is depressed, the lid can be opened inadvertently. Thus, there is room for improvement in being able to prevent opening of the box even when the push button is inadvertently depressed.

SUMMARY OF THE INVENTION

According to the present invention, there is provided a push-button box-opening structure, which comprises: a box; a push button for opening the box; and a button housing for housing the push button in such a manner as to allow the push button to be pushed in from an unlocking starting position to an unlocking position to thereby open the box. The unlocking starting position is set at a position where the push button is pushed in a given depth from a pushing-in starting position.

The push button is provided in the button housing in such a manner that it can be pushed in. Until the push button is pushed into the button housing by the given distance or depth, the box remains closed. Thus, even when the push button is inadvertently pushed in, the box is prevented from opening until the push button is pushed in by the given depth.

When the push button is pushed into the button housing by the specified distance, further pushing of the push button into the unlocking position causes the box to open. Thus, a passenger can open the box only by pushing the push button in, and can easily open the box.

Preferably, a surface of the push button is located at substantially the same level as a rim of the button housing.

If the surface of the push button is protruded outwardly from the rim of the button housing, it is necessary to provide a large pushing-in distance of the push button against striking of an impacting object on the push button in order to keep the box closed. An increased pushing-in distance against striking of an impacting object results in an increased stroke of the push button for opening the box. The increased stroke of the push button requires a large space in which to dispose the push button to ensure the stroke.

On the other hand, if the surface of the push button is recessed inwardly of the rim of the button housing, the push button is not easily seen from a passenger and is not easily pushed in with a finger. In addition, it is not preferable in appearance.

For these reasons, in the present invention, the surface of the push button is located at substantially the same level as the rim of the button housing. Consequently, a stroke of the push button can be made relatively small to dispose the push button in a relatively small space.

Further, the surface of the push button located at substantially the same level as the rim of the button housing allows the push button to be easily seen from a passenger and to be easily pushed in with a finger, and also provides a good appearance.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

First, with reference to FIGS. 1 to 8B, a push-button box structure according to a first embodiment will be described.

Figure 1:
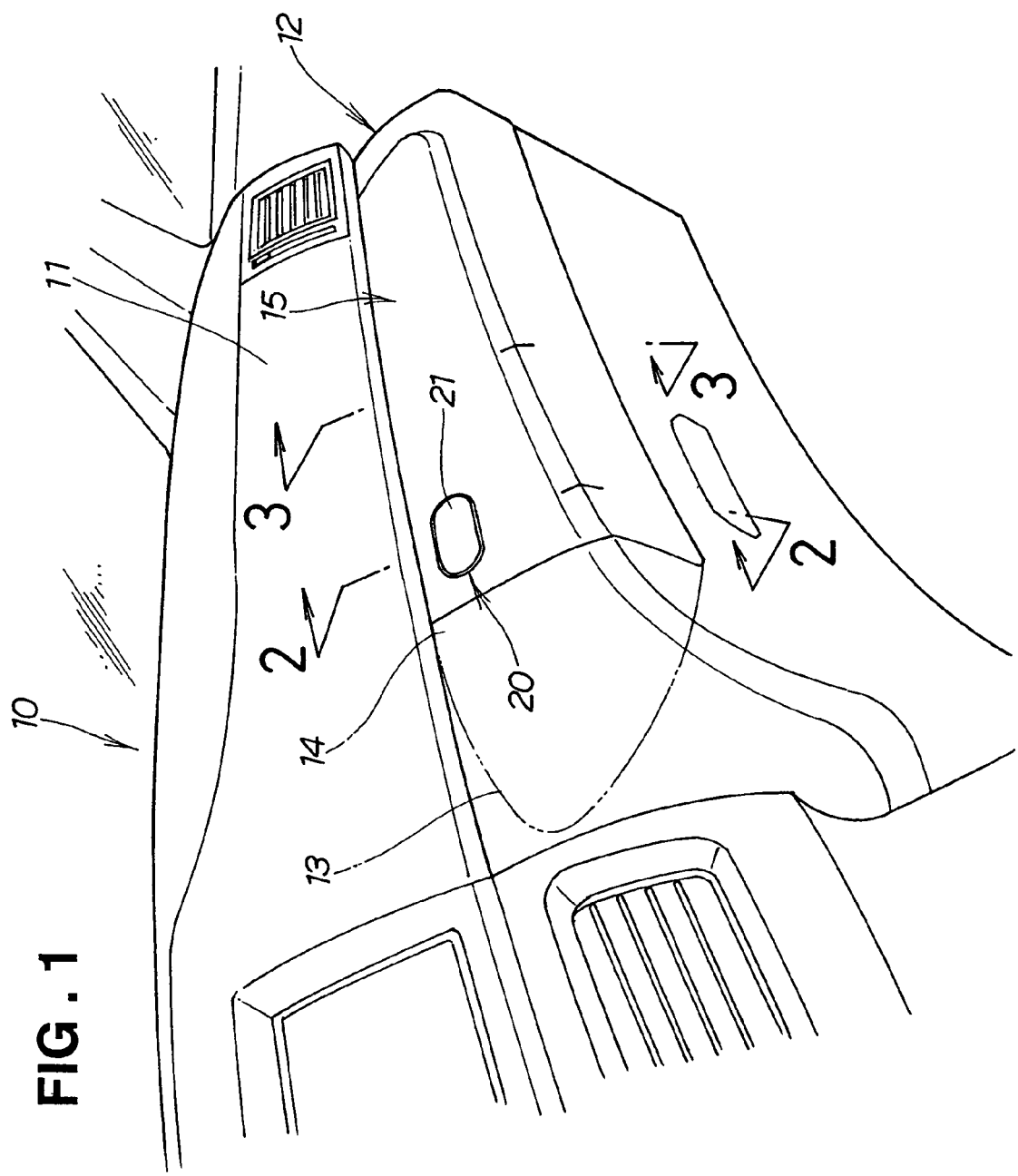
FIG. 1 is a perspective view of an instrument panel provided with a push-button box-opening structure according to a first embodiment of the present invention.

An instrument panel 10 shown in FIG. 1 has a right end portion 11 provided with a box 12 in which to store small things.

The storage box 12 includes a pocket 13 provided in the light end portion 11 of the instrument panel 10 and a lid 15 for opening and closing an opening 14 of the pocket 13. The lid 15 is supported by right and left hinge means 17 (only the left hinge means 17 shown in FIG. 2) to be swingable to a closed position P1 (see FIG. 3) and to an open position P2 (see FIG. 3). The storage box 12 has a push-button box-opening structure 20 in which a push button 21 is pushed in to open the lid 15 retained in the closed position P1.

The right and left hinge means 17, 17 are constituted by identical components. Hereinafter, only the left hinge means 17 will be described to avoid a redundant description of the right hinge means 17.

Figure 2:
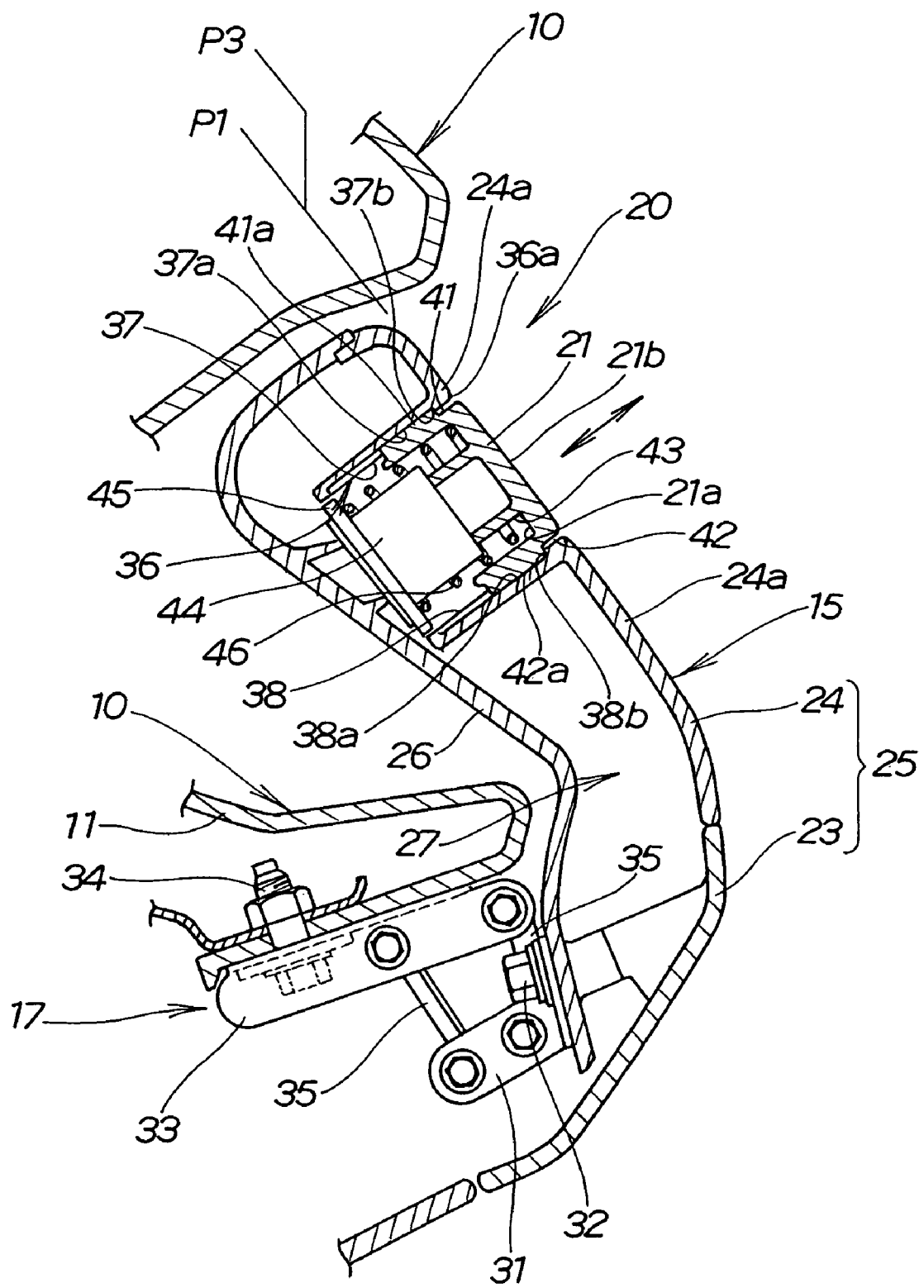
FIG. 2 is a cross-sectional view along line 2-2 in FIG. 1.

As shown in FIG. 2, the lid 15 includes an outer wall 25 formed in a dogleg shape by a lower outer panel 23 and an upper outer panel 24, and an inner panel 26 in a dogleg shape located inside the outer wall 25. A space 27 of a predetermined clearance is formed between the outer wall 25 and the inner panel 26.

A lower bracket 31 of the left hinge means 17 is attached to a left end lower portion of the inner panel 26 by a bolt 32. An upper bracket 33 of the left hinge means 17 is attached to a left end of the instrument panel 10 by a bolt 34. The upper bracket 33 and the lower bracket 31 are connected by a pair of links 35, 35. Thus, the left end of the instrument panel 10 is connected to the left end lower portion of the inner panel 26 via the left hinge means 17.

Like the left hinge means 17, the right hinge means 17 is used to connect a right end of the instrument panel 10 to a right end lower portion of the inner panel 26 via the right hinge means 17.

Figure 3:
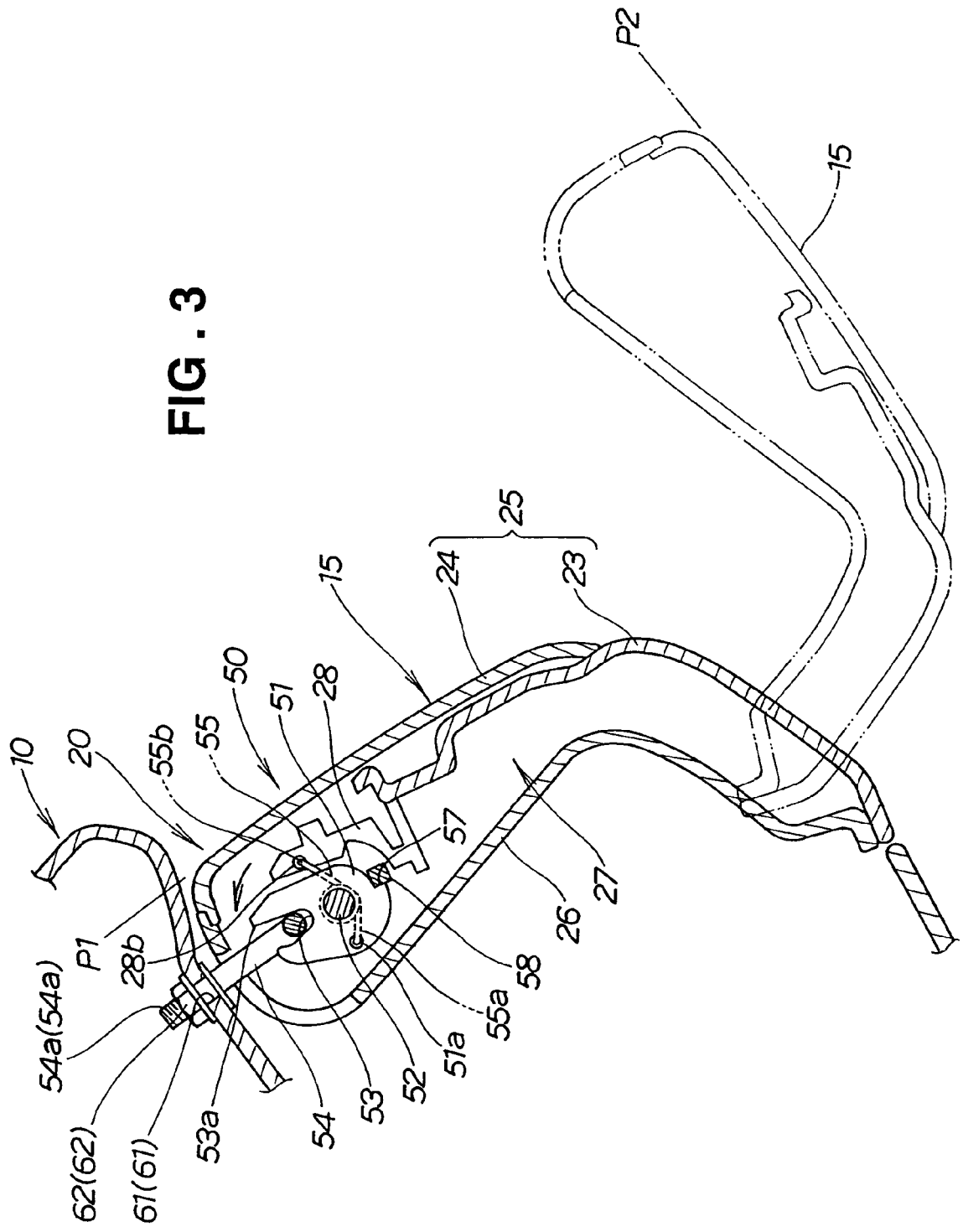
FIG. 3 is a cross-sectional view along line 3-3, in FIG. 1.

The right and left hinge means 17, 17 are used as described above, so that the lid 15 is mounted to the instrument panel 10 to be swingable to the closed position P1 and to the open position P2 (see FIG. 3).

The push button 21 of the push-button box-opening structure 20 is provided in a left end portion of the upper outer panel 24 (that is, in a left end upper portion of the lid 15) in such a manner that it can be pushed in. Specifically, the upper outer panel 24 has a button housing 36 including an opening formed in the left end portion thereof. The button housing 36 has guide grooves 37a and 38a formed in upper and lower walls 37 and 38, respectively.

The push button 21 has upper and lower sliders 41a and 42a formed in such a manner as to protrude from upper and lower walls 41 and 42 thereof, respectively.

The upper slider 41a is movably fitted in the upper guide groove 37a, and the lower slider 42a is movably fitted in the lower guide groove 38a, so that the push button 21 is mounted movably as shown by a two-headed arrow in the button housing 36.

A small-diameter cylindrical protrusion (hereinafter referred to as an "inner cylinder") 43 is formed within the push button 21. A large-diameter cylindrical protrusion (hereinafter referred to as an "outer cylinder") 44 is sidably fitted onto the inner cylinder 43.

The outer cylinder 44 has a flange 45 at the base. The flange 45 is fixed to a left end upper portion of the inner panel 26.

A compression spring 46 is disposed between the flange 45 and a ceiling face 21a of the push button 21. The compression spring 46 biases the push button 21 in a direction in which to protrude it outwardly of the upper outer panel 24.

The push button 21, the outer cylinder 44 and the compression spring 46 are provided in the space 27 between the upper outer panel 24 and the inner panel 26 within the lid 15.

Outer edge portions of the upper and lower sliders 41a and 42a abut outer edge portions 37b and 38b of the upper and lower guide grooves 37a and 38a, so that the push button 21 rests.

The outer edge portions 37b and 38b of the upper and lower guide grooves 37a and 38a and the outer edge portions of the upper and lower sliders 41a and 42a are positioned so that a surface 21b of the push button 21 in the above state is flush with a rim 36a of the button housing 36 and an outer surface 24a of the upper outer panel 24.

A position in which the surface 21b of the push button 21 is substantially flush with the rim 36a of the button housing 36 and the outer surface 24a of the upper outer panel 24 (that is, a position shown in FIG. 2) is a pushing-in starting position P3. Pressure applied to the surface 21b inwardly of the lid 15 causes the push button 21 to be pushed against the spring force of the compression spring 46 into the button housing 36.

As shown in FIG. 3, a locking means 50 of the push-button box-opening structure 20 is provided in an upper substantially central portion of the lid 15.

The locking means 50 includes a latch 51 formed with an engagement groove 53. The latch 51 is rotatably provided with a pin 52. Engagement of a striker 54 with the engagement groove 53 retains the lid 15 in the closed position P1 to keep the storage box 12 (see FIG. 1) closed.

The locking means 50 has a coil spring 55 mounted on the pin 52. A first end 55a of the coil spring 55 is inserted into a mounting hole 51a formed in the latch 51, and a second end 55b is inserted into a mounting hole 28a formed in a bracket 28, so that the latch 51 is biased in the direction of an arrow, that is, in an opening direction of the lid 15. The bracket 28 is a member attached to the inside of the outer wall 25.

The latch 51 has a positioning depression 57 formed in a lower portion thereof. The positioning depression 57 positions the latch 51 in a locking position (position shown in FIG. 3). A lock bar 58 placed against the positioning depression 57 retains the latch 51 in the locking position against the spring force of the coil spring 55.

When the lock bar 58 is disengaged from the positioning depression 57, the latch 51 rotates about the pin 52 in the direction shown by the arrow by the spring force of the coil spring 55, and the lid 15 swingingly moves about the hinge means 17 shown in FIG. 2, so that the engagement groove 53 of the latch 51 disengages from the striker 54. Thereafter, the lid 15 swingingly moves by a spring not shown from the closed position P1 to the open position P2 (position shown by imaginary lines). With this, the storage box 12 (see FIG. 1) opens.

Figure 4:
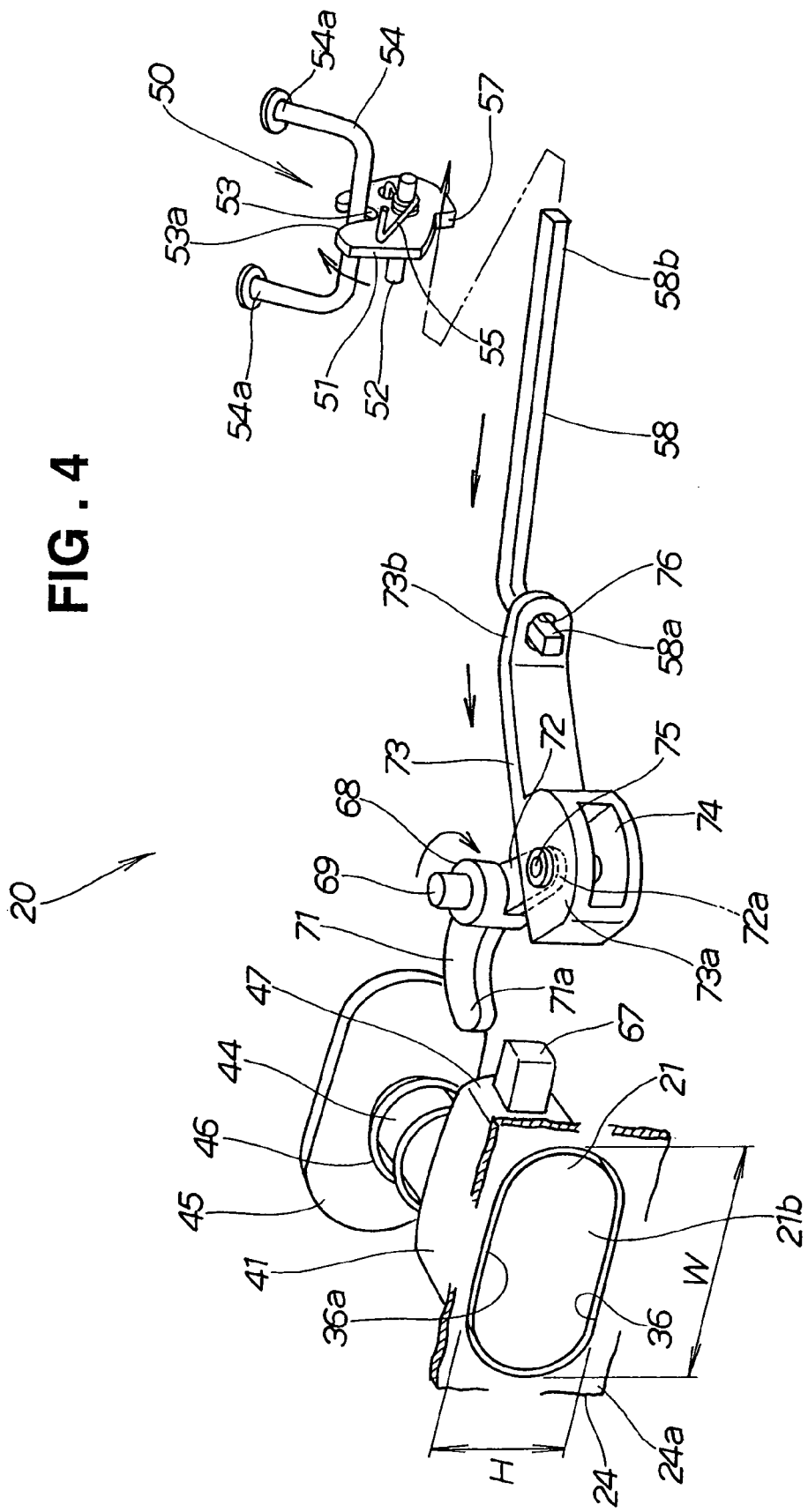
FIG. 4 is a perspective view showing the relationship between a push button and a locking means according to the first embodiment.

The striker 54 has a U shape as shown in FIG. 4. Opposite end portions 54a, 54a of the striker 54 are inserted into mounting holes 61, 61 in the instrument panel 10, and nuts 62, 62 are screw-connected to the end portions 54a, 54a protruded from the instrument panel 10, respectively. Thus, the striker 54 is attached to the instrument panel 10.

As shown in FIG. 4, the push button 21 is provided in the button housing 36 in such a manner that it can be pushed in. Until the push button 21 is pushed into the button housing 36 by a specified distance, the locking means 50 is kept in a non-operated position. After the push button 21 is pushed into the button housing 36 by the specified distance, the push button 21 further pushed in releases the locking means 50 from the locking position. The shape of the button housing 36 (specifically, the height H of the button housing 36) is so determined that, when an impacting object 65 (see FIG. 8) strikes the push button 21, the rim 36a of the button housing 36 and the outer surface 24a of the upper outer panel 24 sustain the impacting object 65, preventing the push button 21 from being pushed into the button housing 36 by the specified distance.

In a comparison between the height H and the width W of the button housing 36, the height H is smaller than the width W. Therefore, the intruding distance of the impacting object 65 into the button housing 36 is restricted by the height H.

A pushing protrusion 67 for pushing is provided at a side wall 47 of the push button 21. An operating link 68 is rotatably provided about a pin 69 in front of (in a pushing direction of) the pushing protrusion 67. The operating link 68 has a first lever 71 extending in a curve toward the pushing protrusion 67, and a second lever 72 extending rearward.

A distal end portion 71a of the first lever 71 is disposed at a certain distance from the pushing protrusion 67. A distal end portion 72a of the second lever 72 is inserted into an insertion hole 74 formed in a distal end portion 73a of a slider 73 and connected to the distal end portion 73a of the slider 73 via a connecting pin 75.

A connection hole 76 is formed in a proximal end portion 73b of the slider 73. A bent portion 58a formed at a first end portion of the lock bar 58 is inserted into the connection hole 76, whereby the bent portion 58a of the lock bar 58 is connected to the proximal end portion 73b of the slider 73.

A second end portion 58b of the lock bar 58 is placed against the positioning depression 57 formed in the latch 51. The latch 51 is retained in the locking position against the spring force of the coil spring 55. With this, the engagement groove 53 in the latch 51 engages the striker 54, and the lid 15 (see FIG. 3) is retained in the closed position P1.

When the surface 21b of the push button 21 is pressed to push the push button 21 into the button housing 36, the pushing protrusion 67 abuts on the distal end portion 71a of the first lever 71, and the distal end portion 71a of the first lever 71 is pushed out forward by the pushing protrusion 67.

The relationship between the pushing-in distance of the push button 21 and the timing of abutting of the pushing protrusion 67 against the distal end portion 71a of the first lever 71 will be described in detail below with FIG. 5.

When the distal end portion 71a of the first lever 71 is pushed out forward by the pushing protrusion 67, the operating link 68 rotates as shown by an arrow, and the second lever 72 causes the slider 73 to slide as shown by an arrow.

The slider 73 sliding as shown by the arrow causes the lock bar 58 to move as shown by an arrow, and the second end portion 58b of the lock bar 58 disengages from the positioning depression 57 in the latch 51.

The locking means 50 is released from the locking position, and the latch 51 rotates about the pin 52 as shown by an arrow by the spring force of the coil spring 55. The engagement groove 53 of the latch 51 disengages from the striker 54 as described above.

The push button 21, the outer cylinder 44, the compression spring 46, the operating link 68, the slider 73, the lock bar 58, the locking means 50 and the striker 54 are provided in the space 27 between the upper outer panel 24 and the inner panel 26 shown in FIG. 3, and are thus provided within the lid 15.

Figure 5:
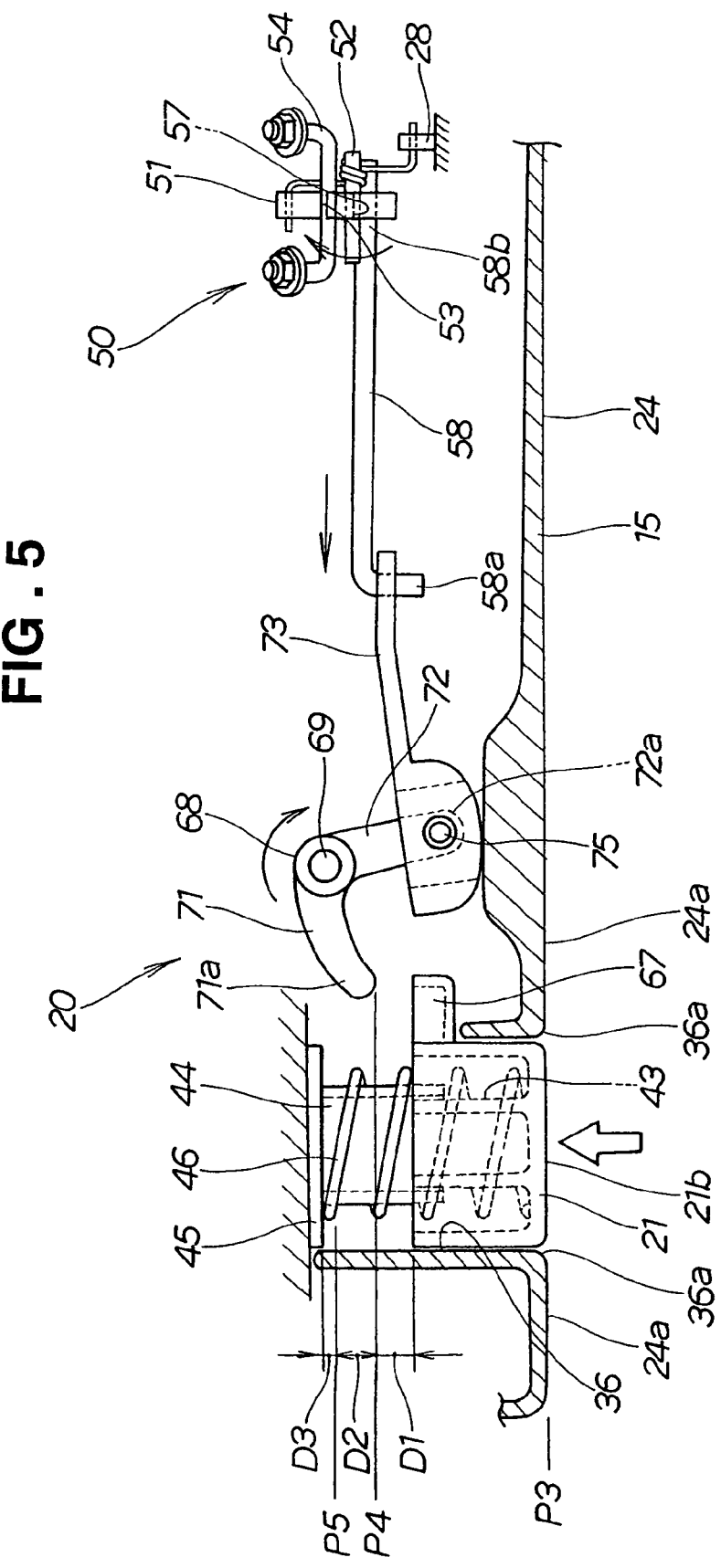
FIG. 5 is a cross-sectional plan view of FIG. 4.

As shown in FIG. 5, the push button 21 is disposed in the pushing-in starting position P3 so that the locking means 50 is in the locking position, that is, the second end portion 58b of the lock bar 58 is engaged with the positioning depression 57 of the latch 51 (see also FIG. 4). In this state, the distal end portion 71a of the first lever 71 is disposed at a specified distance D1 from the pushing protrusion 67 of the push button 21. With this, unless the push button 21 is pushed by the specified distance D1 into the button housing 36 so that the push button 21 reaches an unlocking starting position P4, the pushing protrusion 67 does not abut on the distal end portion 71a of the first lever 71. Therefore, when the push button 21 is pushed into the button housing 36 as shown by an arrow by a pushing-in distance smaller than the specified distance D1, the operating link 68 is kept at rest, and the locking means 50 is kept in the locking position.

When the push button 21 is further pushed in from the position where the pushing protrusion 67 of the push button 21 abuts on the distal end portion 71a of the first lever 71, the pushing protrusion 67 of the push button 21 pushes out the distal end portion 71a of the first lever 71 forward.

The pushing protrusion 67 pushing the distal end portion 71a of the first lever 71 forward causes the operating link 68 to rotate about the pin 69 as shown by an arrow. The rotation of the operating link 68 causes the second lever 72 to slide the slider 73 as shown by an arrow, causing the lock bar 58 to move as shown by the arrow.

When the pushing-in distance of the push button 21 becomes equal to an operating distance D2 and the push button 21 reaches an unlocking position P5, the second end portion 58b of the lock bar 58 pulls out from the positioning depression 57 of the latch 51. This releases the locking means 50 from the locking position, and the latch 51 rotates about the pin 52 by the spring force of the coil spring 55 as shown by an arrow. The engagement groove 53 of the latch 51 disengages from the striker 54, and the lid 15 is opened by the spring not shown from the closed position P1 (see FIG. 3) to the open position P2 (see FIG. 3).

Thereafter, the push button 21 is further pushed in by a bottom-touching distance D3 to cause the push button 21 to abut on the flange 45 and rest, and thereby to confirm that the push button 21 is certainly pushed into the unlocking position.

Next, with reference to FIGS. 6A to 7B, an instance of opening the lid 15 with the push button 21 will be described.

Figure 6A:
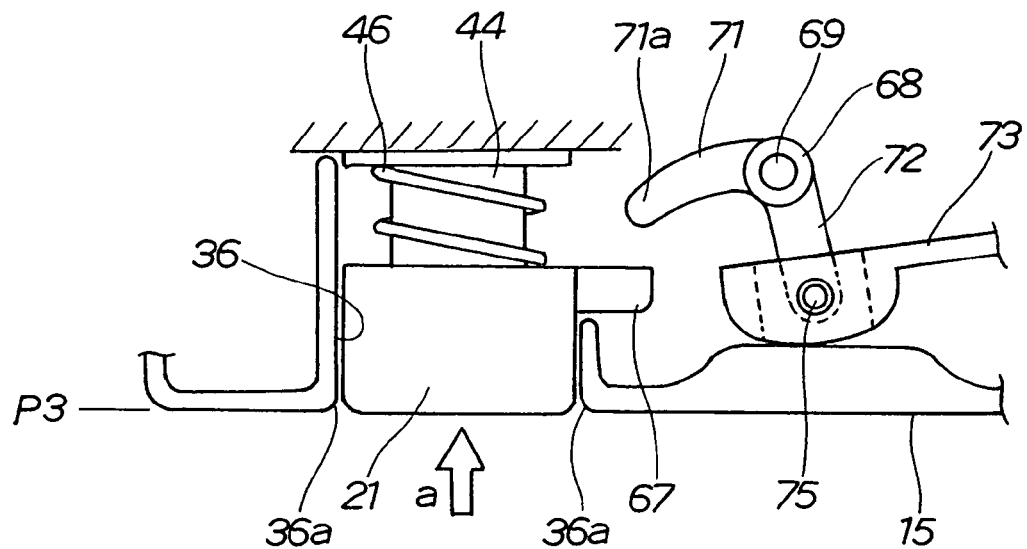
FIGS. 6A and 6B are diagrams showing the push button in the first embodiment pushed in by a specified distance.

Referring to FIG. 6A, the push button 21 in the pushing-in starting position P3 is pushed into the button housing 36 as shown by arrow a against the spring force of the compression spring 46.

Figure 6B:
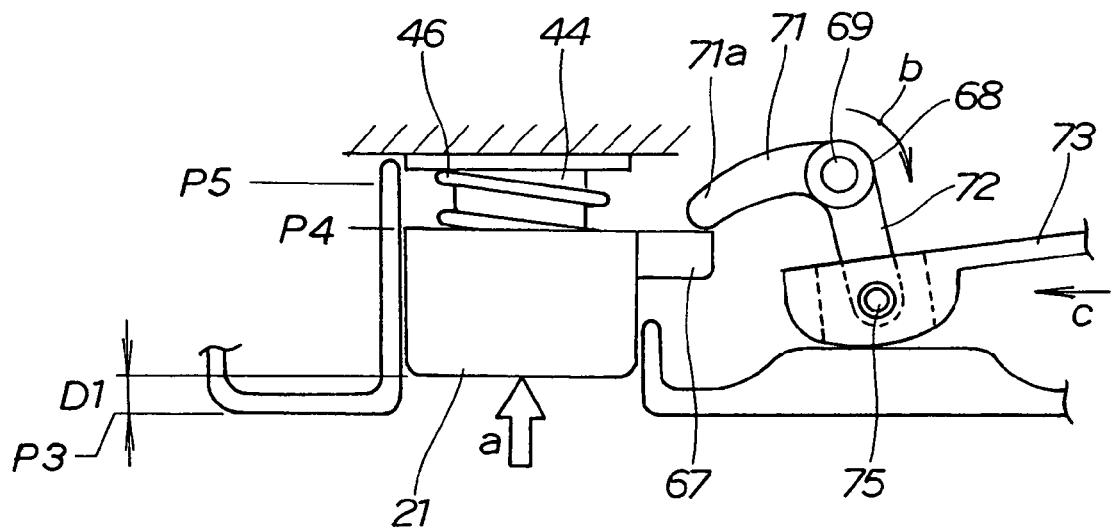

Referring to FIG. 6B, the push button 21 is pushed in by the specified distance D1 to the unlocking starting position P4 to make the pushing protrusion 67 abut on the distal end portion 71a of the first lever 71. From this position, the push button 21 is pushed in by the operating distance D2 (see FIG. 5) to the unlocking position P5 to cause the pushing protrusion 67 of the push button 21 to push out the distal end portion 71a of the first lever 71 forward.

With the distal end portion 71a of the first lever 71 pushed out forward, the operating link 68 rotates about the pin 69 as shown by arrow b, causing the second lever 72 to slide the slider 73 as shown by arrow c. The slide of the slider 73 causes the lock bar 58 shown in FIG. 5 to move as shown by the arrow.

Figure 7A:
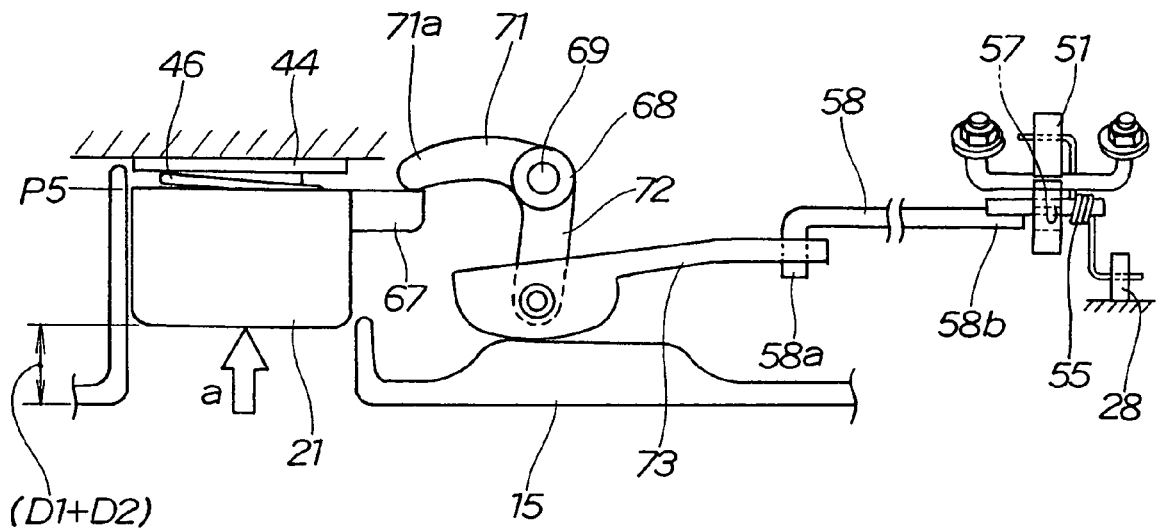
FIGS. 7A and 7B are diagrams showing the push button pushed in further from the position shown in FIG. 6B.

Referring to FIG. 7A, when the push button 21 reaches the unlocking position P5 and the pushing-in distance of the push button 21 is (specified distance D1+operating distance D2), the second end portion 58b of the lock bar 58 disengages from the positioning depression 57 of the latch 51.

Figure 7B:
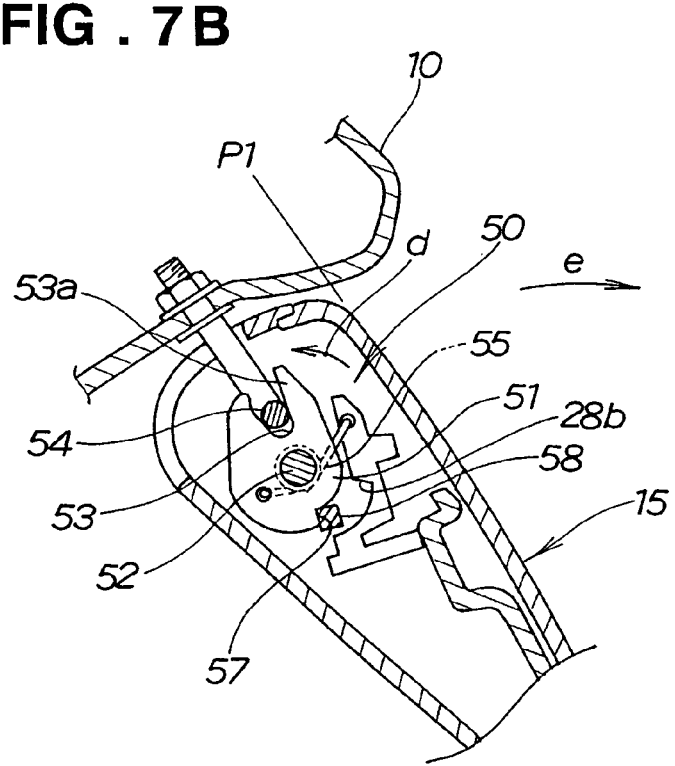

Referring to FIG. 7B, the locking means 50 is released from the locking position, and the latch 51 rotates about the pin 52 as shown by arrow d by the spring force of the coil spring 55. The engagement groove 53 of the latch 51 disengages from the striker 54, and the lid 15 swingingly moves from the closed position P1 (see FIG. 3) to the open position P2 (see FIG. 3) by the spring not shown as shown by arrow e. Thus, the lid 15 swingingly moves to the open position P2, thereby opening the storage box 12 (see FIG. 1).

The latch 51 rotating about the pin 52 as shown by the arrow d is retained in a predetermined position by the positioning depression 57 abutting on a stopper 28b, so as not to rotate over the position.

Next, a situation where the impacting object 65 strikes the push button 21 will be described with reference to FIGS. 8A and 8B.

Figure 8A:
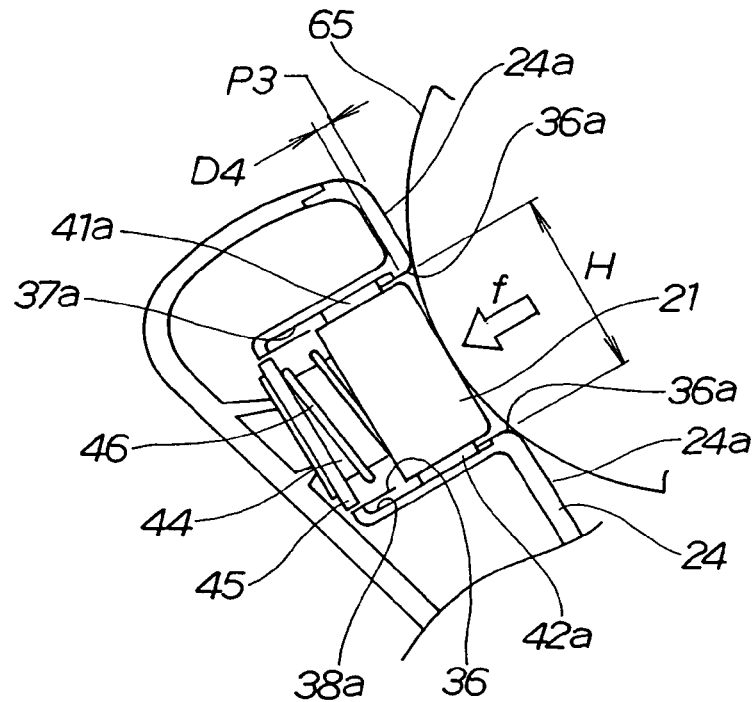
FIGS. 8A and 8B are diagrams showing an instance where an impacting object strikes the push button in the first embodiment.

Referring to FIG. 8A, when the impacting object 65 strikes the push button 21 as shown by arrow f, the impacting object 65 is sustained by the rim 36a of the button housing 36 and the outer surface 24a of the upper outer panel 24.

As described with FIG. 4, the button housing 36 is formed with the width W and the height H, the height H being smaller than the width W. The intruding distance of the impacting object 65 into the button housing 36 is restricted by the height H, and the intruding distance of the push button 21 is limited to D4.

Figure 8B:
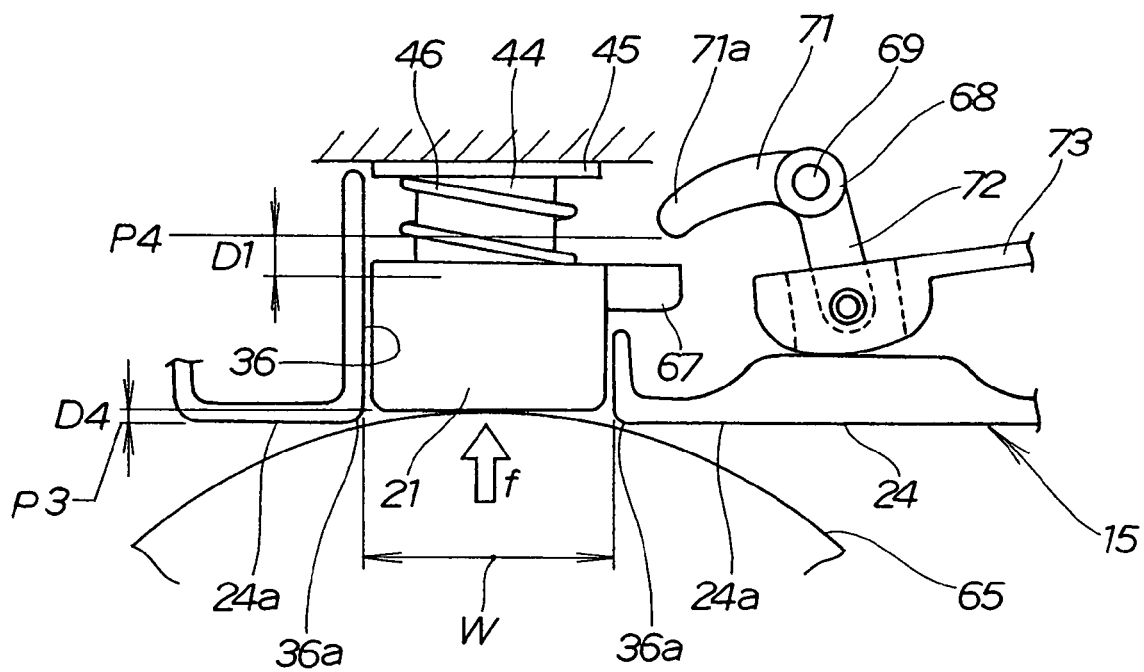

Referring to FIG. 8B, with the intruding distance of the impacting object 65 into the button housing 36 restricted to D4 by the height H (see FIG. 8A), the intruding distance D4 of the impacting object 65 can be made smaller than the specified distance D1. Therefore, the push button 21 does not reach the unlocking starting position P4.

As shown in FIG. 5, with the push button 21 disposed in the pushing-in starting position P3, the distal end portion 71a of the first lever 71 is disposed at the specified distance D1 from the pushing protrusion 67 of the push button 21. Therefore, when the impacting object 65 strikes the push button 21, the pushing protrusion 67 does not abut on the distal end portion 71a of the first lever 71.

The operating link 68 is retained at rest, and the locking means 50 (see FIG. 5) is kept in the locking position. This allows the lid 15 to rest in the closed position P1 (see FIG. 3) to keep the storage box 12 (see FIG. 1) closed.

Figure 10:
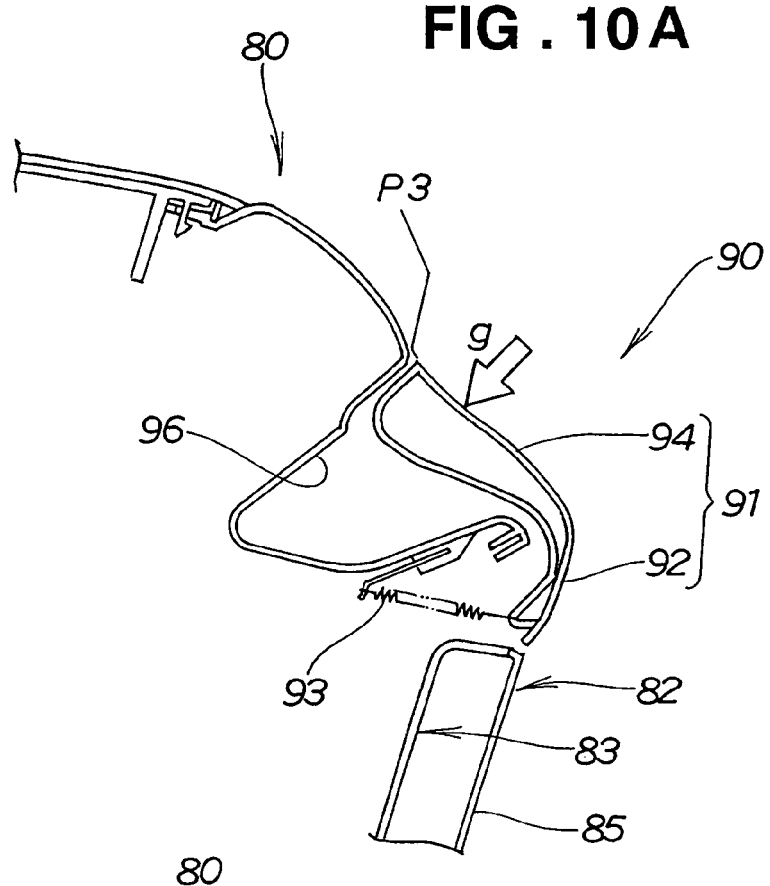
FIGS. 10A and 10B are diagrams showing an instance where a push button in the second embodiment shown in FIG. 9 is pushed in to open a pocket.
Figure 10:
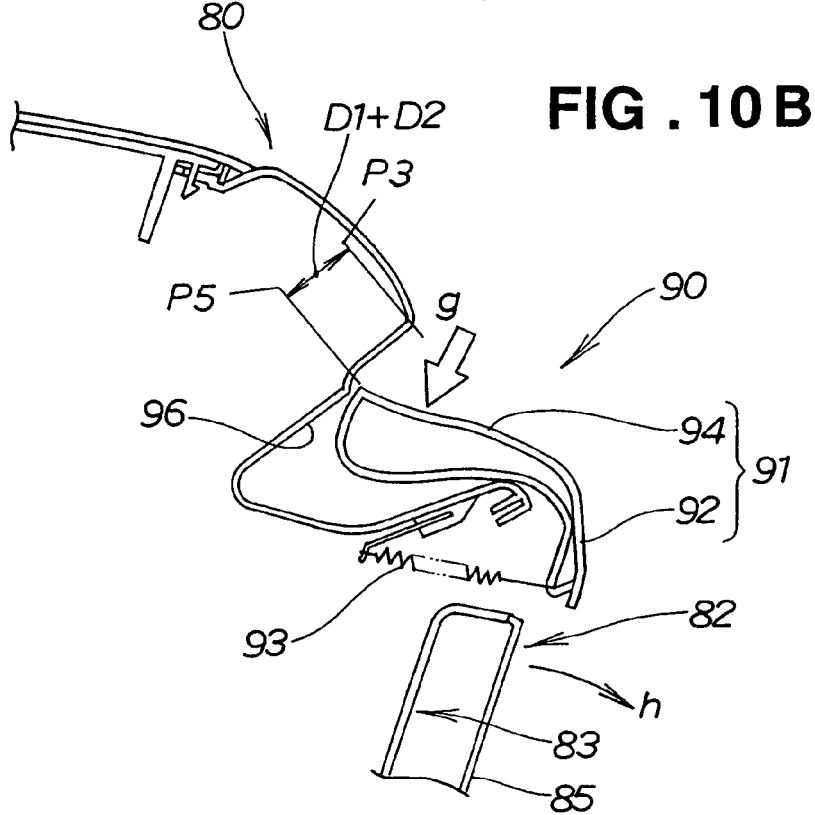
Figure 11:
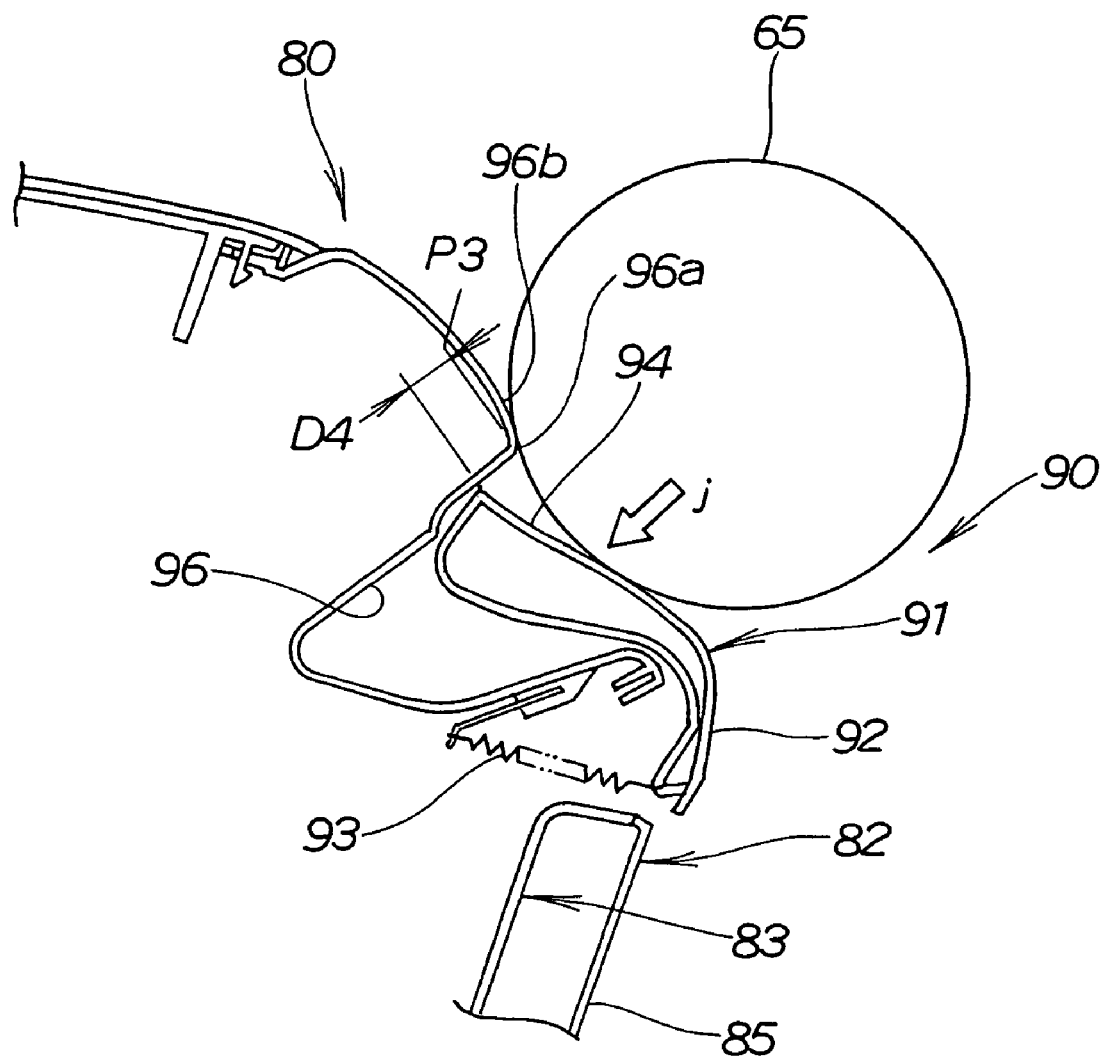
FIG. 11 is a diagram showing an instance where an impacting object strikes the push button in the second embodiment.

Next, a box opening structure according to a second embodiment of the present invention will be described with reference to FIGS. 9 to 11.

Figure 9:
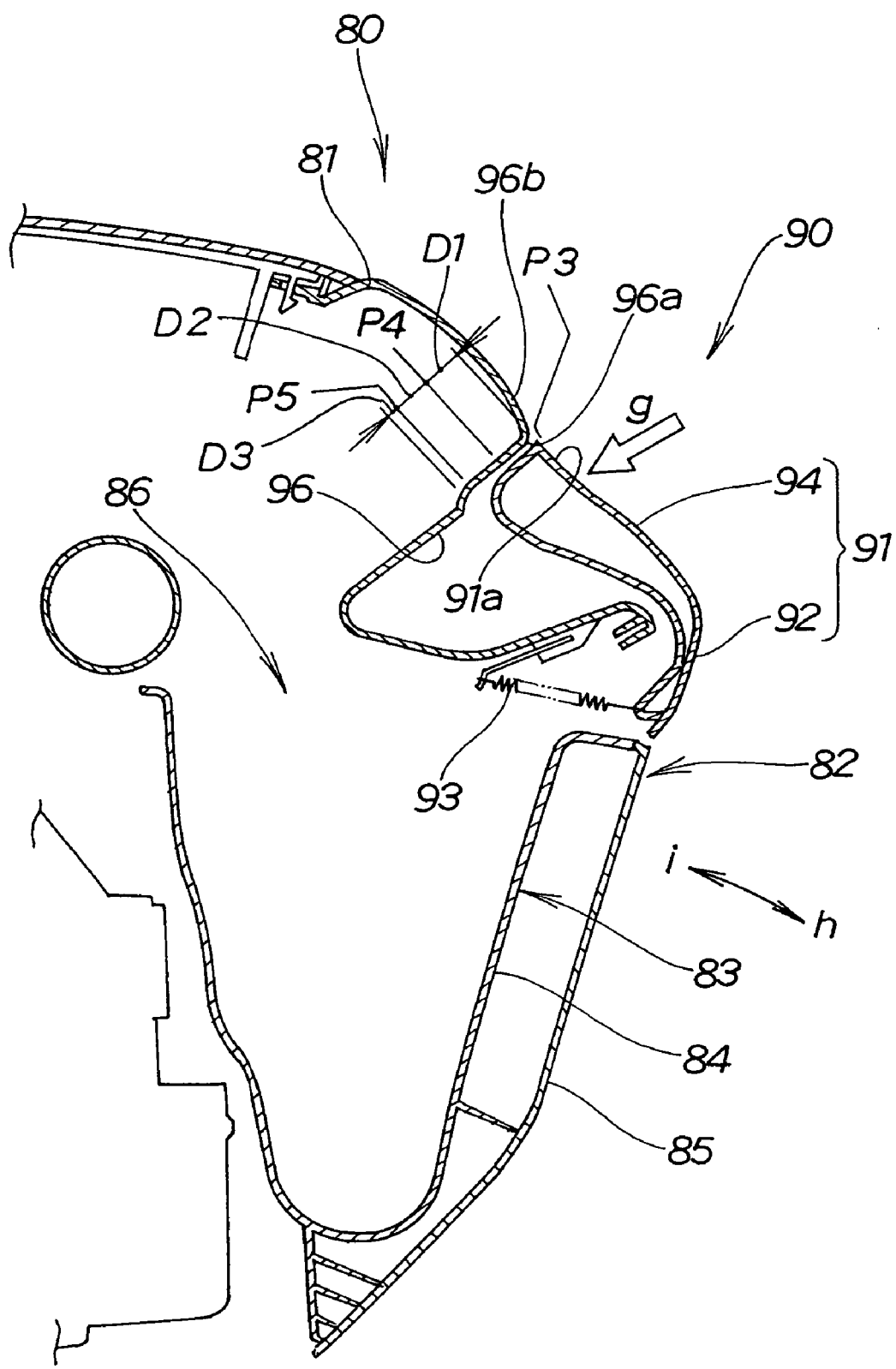
FIG. 9 is a cross-sectional view showing a push-button box-opening structure according to a second embodiment of the present invention.

FIG. 9 shows an instrument panel according to the second embodiment.

An instrument panel 80 has a right end portion 81 provided with a storage box (box) 82 according to the present invention.

The storage box 82 includes a pocket 83 provided in the right end portion 81 of the instrument panel 80, a lid 85 provided at an outer wall 84 of the pocket 83, and a push button 91 of a push-button box-opening structure 90 provided above the pocket 83.

The push-button box-opening structure 90 has substantially the same structure as the push-button box-opening structure 20 in the first embodiment.

The pocket 83 is configured to swingingly move about a lower pin (not shown) as shown by arrow h so that an opening 86 of the pocket 83 protrudes outwardly from the instrument panel 80, and to swingingly move about the lower pin (not shown) as shown by arrow i so that the opening 86 is fitted in the instrument panel 80.

A base 92 of the push button 91 is connected to the instrument panel 80 via a tension spring 93. A button body 94 of the push button 91 is opposed to a button housing (recess) 96. The push button 91 is retained in a pushing-in starting position P3 by the spring force of the tension spring 93.

When the push button 91 is located in the pushing-in starting position P3, a surface 91a of the push button 91 is substantially flush with a rim 96a of the button housing 96 and an outer surface 96b around the rim 96a.

To open the pocket 83, pressure is applied to the button body 94 of the push button 91 as shown by arrow g to push the button body 94 into the button housing 96 against the spring force of the tension spring 93 by a predetermined distance (that is, specified distance D1+operating distance D2) to an unlocking position P5.

This releases the lock of a locking means (not shown), and causes the pocket 83 to swingingly move about the lower pin (not shown) as shown by the arrow h. Then, the opening 86 of the pocket 83 protrudes outwardly from the instrument panel 80 to open the pocket 83 (that is, the storage box 82).

The locking means has substantially the same structure as the locking means 50 in the first embodiment (see FIGS. 4 and 5).

To close the pocket 83, pressure is applied to the lid 85 to push the pocket 83 in about the lower pin (not shown) as shown by the arrow i. The opening 86 of the pocket 83 is fitted in the instrument panel 80 to close the pocket 83.

Like the push button 21 in the first embodiment, even when the button body 94 of the push button 91 in the second embodiment is pushed into the button housing 96 by the specified distance D1 from the pushing-in starting position P3 to an unlocking starting position P4, the locking means of the push-button box-opening structure 90 is kept in a locking position.

By further pushing the button body 94 in from the unlocking starting position P4 to which the button body 94 has been pushed in by the specified distance D1, the locking means of the push-button box-opening structure 90 is operated.

When the pushing-in distance of the button body 94 becomes equal to the operating distance D2 and the button body 94 reaches the unlocking position P5, the locking means is released from the locking position.

The release from the locking position causes the pocket 83 to swingingly move about the lower pin (not shown) as shown by the arrow h to open the pocket 83, that is, the storage box 82, Thereafter, by further pushing the button body 94 in by a bottom-touching distance D3, the button body 94 abuts on a stopper (not shown) and rests, and a passenger confirms that the button body 94 is certainly pushed into the unlocking position.

Next, an instance of opening the pocket 83 with the push button 91 of the push-button box-opening structure 90 according to the second embodiment will be described with reference to FIGS. 10A and 10B.

Referring to FIG. 10A, the push button 91 is retained in the pushing-in starting position P3 by the tension spring 93 and the locking means. The button body 94 of the push button 91 is pushed against the spring force of the tension spring 93 into the button housing 96 as shown by arrow g.

Referring to FIG. 10B, the button body 94 is pushed in by the specified distance D1 to the unlocking starting position P4 (see FIG. 9). From this position, the button body 94 is further pushed in to operate the locking means of the push-button box-opening structure 90.

When the button body 94 is pushed in by the specified distance D1+the operating distance D2 to the unlocking position P5, the locking means is released from the locking position, and the pocket 83 swingingly moves about the lower pin (not shown) as shown by arrow h to open the pocket 83, that is, the storage box 82.

Next the operation of the push-button box-opening structure 90 in the second embodiment when an impacting object 65 strikes the push button 91 will be described with reference to FIG. 11.

When the impacting object 65 strikes the button body 94 of the push button 91 as shown by arrow j, the impacting object 65 is sustained by the rim 96a of the button housing 96 and the outer surface 96b around the rim 96a. Thus, the intruding distance of the impacting object 65 into the button housing 96 is restricted by the rim 96a of the button housing 96 and the outer surface 96b around the rim 96a, and the intruding distance of the button body 94 is limited to D4. The intruding distance D4 is smaller than the specified distance D1.

The intruding distance D4 of the button body 94 made smaller than the specified distance D1 allows the locking means to be kept in the locking position even when the impacting object 65 strikes the button body 94. This allows the pocket 83 to rest in a closed position to keep the storage box 82 closed.

In the first embodiment, the storage box (glovebox) 12 provided in the instrument panel 10 is illustrated as a box to which the present invention is applied. The present invention is also applied to an ashtray, a cup holder and the like.

The first embodiment has been described with the example in which the specified distance D1 for preventing the storage box 12 from opening is provided by disposing the distal end portion 71a of the first lever 71 at a certain distance from the pushing protrusion 67. However, the structure for providing the specified distance D1 is not limited thereto. Another means such as elongating the connection hole 76 for connecting the lock bar 58 to the slider 73 can also provide the specified distance D1.

As described above, a push-button box-opening structure of the present invention is so constructed that a box in a closed position is opened by pushing a push button in, and is suitable for application to automobiles.

Obviously, various minor changes and modifications of the present invention are possible in the light of the above teaching. It is therefore to be understood that within the scope of the appended claims the invention may be practiced otherwise than as specifically described.

What is claimed is:

1. An instrument panel for a motor vehicle, said instrument panel comprising a push-button box-opening structure, said push-button box-opening structure comprising:

a box provided in the instrument panel, the box including an opening to an interior space within the box;

a lid hingedly connected to the instrument panel such that the lid is selectively movable from a closed position in which the lid blocks access to the interior space within the box and an open position in which the lid permits access to the interior space within the box;

a button housing mounted in the lid for housing a push button that can be pushed in from a pushing-in starting position to an unlocking starting position and further to an unlocking position to thereby disengage a latch operatively associated with the push button to allow the lid to be moved from the closed position to the open position; and an assembly that operably extends between the push button and a striker and cooperates with the striker to secure the box in the closed position, wherein the assembly includes the latch, wherein the latch engages the striker and wherein the assembly cooperates with the push button to release the latch from the striker to thereby permit the lid to move from the closed position into the open position, wherein the latch is biased toward an open position releasing the striker and is held in a closed position by the assembly, wherein the surface of the push button is substantially flush with the outer surface of the lid when the push button is in the pushing-in starting position, and wherein the unlocking starting position is provided at a position where the push button is pushed in a predetermined depth from the pushing-in starting position.

2. The instrument panel as set forth in claim 1, wherein the surface of the push button is substantially flush with a rim of the button housing.

3. The instrument panel according to claim 1, wherein the push button is biased toward the pushing-in starting position.

4. The instrument panel according to claim 1, wherein the push button is biased toward the pushing-in starting position.

\* \* \* \* \*

UNITED STATES PATENT AND TRADEMARK OFFICE
CERTIFICATE OF CORRECTION

| | | |
|---|---|---|
| PATENT NO. | : 7,775,566 B2 | Page 1 of 1 |
| APPLICATION NO. | : 11/167824 | |
| DATED | : August 17, 2010 | |
| INVENTOR(S) | : Hanjono et al. | |

It is certified that error appears in the above-identified patent and that said Letters Patent is hereby corrected as shown below:

In Column 10, Lines 30-31, in Claim 4, delete "4. The instrument panel according to claim 1, wherein the push button is biased toward the pushing-in starting position.".

Signed and Sealed this
Twenty-ninth Day of March, 2011

David J. Kappos
*Director of the United States Patent and Trademark Office*